& Erickson

United States Patent [19]
Kamiyama et al.

[11] Patent Number: 4,490,663
[45] Date of Patent: Dec. 25, 1984

[54] DEVICE FOR DRIVING A STEPPING MOTOR

[75] Inventors: Shuichi Kamiyama, Tokyo; Yoji Okada, Hitachi, both of Japan

[73] Assignee: Mikuni Kogyo Kabushiki Kaisha, Tokyo, Japan

[21] Appl. No.: 392,889

[22] Filed: Jun. 28, 1982

[30] Foreign Application Priority Data

Feb. 8, 1982 [JP] Japan .................................. 57-18548

[51] Int. Cl.³ .............................................. H02K 29/04
[52] U.S. Cl. ...................................... 318/696; 318/685
[58] Field of Search ................................ 318/685, 696

[56] References Cited
U.S. PATENT DOCUMENTS 3,826,966 7/1974 Nagasaka et al. ................ 318/696
4,140,955 2/1979 Drabing ............................... 318/696

Primary Examiner—J. V. Truhe
Assistant Examiner—Saul M. Bergmann
Attorney, Agent, or Firm—Owen, Wickersham & Erickson

[57] ABSTRACT

A device for driving a stepping motor for use in a vehicle is disclosed. The device comprises a plurality of phase coils, a switching means connected to the phase coils, a pulse distributor circuit connected to the switching means for generating control signals thereby controlling the ON or OFF state of the switching means, a connection means for connecting the phase coils to a power supply source, and a current sustaining means connected between the connection means and the phase coils in common therewith.

2 Claims, 7 Drawing Figures

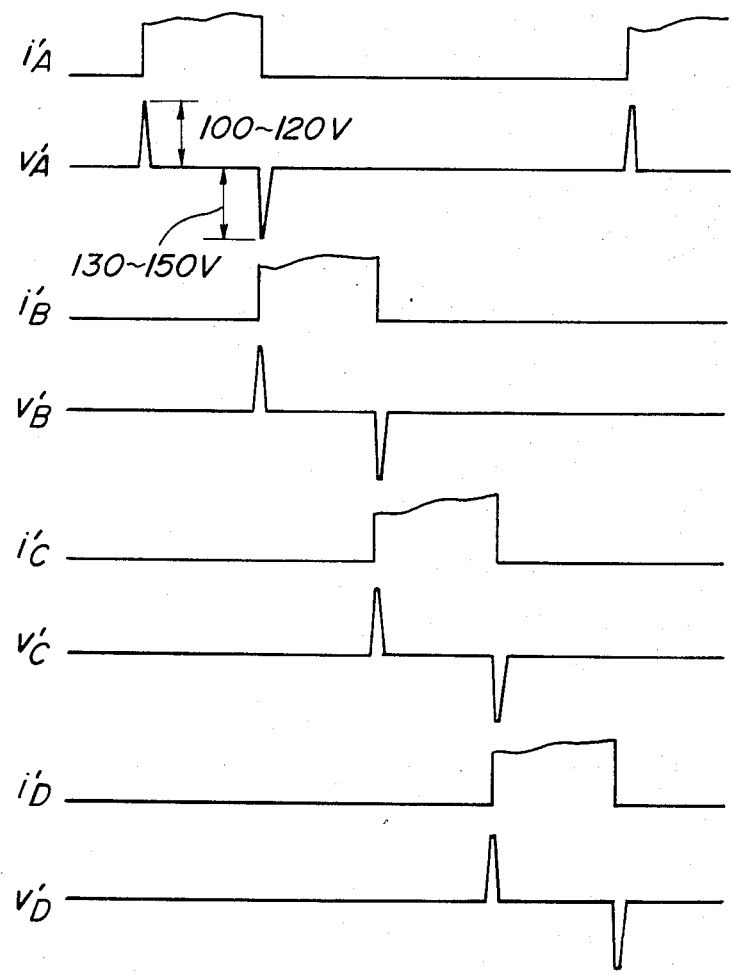

DEVICE FOR DRIVING A STEPPING MOTOR

BACKGROUND OF THE INVENTION

1. Field of the Invention

The present invention relates to a device for driving a stepping motor which is capable of driving the motor with high efficiency by improving the leading edge characteristics of input pulses supplied to the motor.

2. Description of the Prior Art

It is well known that a stepping motor which is also referred to as a pulse motor, in general, is a motor in which a plurality of phase coils are excited or energized with input pulses by changing them over one by one, thereby rotating its rotor by angles corresponding to the number of input pulses. Such a motor has been widely utilized for electrically controlling mechanical rotation and action of a machine since control of the stepping motor can easily be effected in addition to simple construction and low price.

As to stepping motors there are three phase stepping motors, four phase stepping motors and five phase stepping motors. The driving circuit of the stepping motor utilizes the system of 1 phase excitation and 1-2 phase excitation as well as micro-stepping drive for precise control. Moreover, the leading edge characteristics of input pulses affect the driving characteristic of the stepping motor since as described above the pulses continuously supplied therein one by one with a certain phase difference are changed over thereby obtaining the driving power. When the input pulses are changed over to distribute them to respective phase coils the leading edge of the pulses does not become steep because of a lagging current due to an inductance of a motor driving phase coil resulting in a threshold of rotational speed and an unstable rotational speed.

One embodiment of the conventional stepping motor driving device is shown in FIG. 1 and its operation is described with reference to FIG. 2.

In FIG. 1 reference PM is a drive phase section of a stepping motor (not shown). The drive phase section comprises four phase coils A, B, C, and D and one end portion of respective coils is connected in common and to a power supply terminal $P_3$ through a resistor $R_1$. The terminal $P_3$ is connected to a power supply source (not shown) which supplies a supply voltage Vcc. The other end portions of respective coils A, B, C and D are connected to a grounded point through collector-emitter paths of switching transistors $TR_1$, $TR_2$, $TR_3$ and $TR_4$, respectively. That is, the transistor $TR_1$ is connected to the phase coil A, the transistor $TR_2$ to the phase coil B, the transistor $TR_3$ to the phase coil C and the transistor $TR_4$ to the phase coil D. The base electrodes of respective transistors $TR_1$ to $TR_4$ are connected to the output terminals of a control pulse distributor circuit CPD through resistors $R_2$, respectively. The pulse distributor circuit CPD has a drive pulse input terminal $P_1$ and an UP/DOWN signal input terminal $P_2$ and generates control signals $CP_1$, $CP_2$, $CP_3$ and $CP_4$ which control the ON and OFF states of the transistors $TR_1$, $TR_2$, $TR_3$ and $TR_4$ in regular order. In such a conventional stepping motor the supply voltage Vcc is 10 to 20 V and the resistor $R_1$ has a value of 5 to 10Ω.

When the supply voltage Vcc is applied to the terminal $P_3$ and the control pulse distributor circuit CPD distributes control pulses $CP_1$ to $CP_4$ to the switching transistors $TR_1$ to $TR_4$, respectively, in regular order, phase currents $i_A$, $i_B$, $i_C$ and $i_D$ as shown in FIG. 2 flow in the phase coils A to D, respectively, resulting in a generation of magnetic flux $\phi_A$, $\phi_B$, $\phi_C$ or $\phi_D$, thereby driving the stepping motor. As is seen from FIG. 2 the phase currents $i_A$ to $i_D$ rise with slow curve and reach a stationary state. The time for reaching such a state is about 0.5 to 1 msec. In this case the generated voltage is 10 to 20 V as a kick voltage at a leading edge instant of the current and is 100 to 120 V as a trailing edge pulse at a trailing edge instant of the current. In order to improve such a voltage characteristic in the conventional circuit as it is, therefore, it is necessary to make the supply voltage Vcc equal to or more than 100 V and the value of resistor $R_1$ equal to or more than 20Ω, so that the resistor $R_1$ with such a high resistance value consumes a high power and it can not be practically used. In the stepping motor driven by a battery which is carried on a vehicle, particularly, the driving device with such a resistor can not be utilized. In order to drive the stepping motor, therefore, it is desirable to improve the leading edge characteristics of input pulses.

SUMMARY OF THE INVENTION

It is an object of the present invention to overcome the above described disadvantage of the conventional stepping motor driving device.

It is another object of the present invention to provide a device for driving a stepping motor in which the leading edge characteristics of input pulses are improved.

According to the present invention there is provided a device for driving a stepping motor comprising a plurality of phase coils, a switching means connected to the phase coils, a pulse distributor circuit connected to the switching means for generating control signals thereby controlling the ON or OFF state of the switching means, a connection means for connecting the phase coils to a power supply source, and a current sustaining means connected between the connection means and the phase coils in common therewith.

The current sustaining means is a choke coil. The switching means comprises a plurality of transistors. A plurality of variable resistors are provided between respective transistors and a grounded point, respectively. The phase coils are wound on a stator core which is formed by ferrite material.

BRIEF DESCRIPTION OF THE DRAWING

These and other features and advantages of the present invention will become readily apparent from the following detailed description of one embodiment of the present invention, particularly when taken in connection with the accompanying drawings wherein like reference numerals designate like or functionally equivalent parts throughout, and wherein;

FIG. 4 is a waveform chart explaining an operation of the driving device shown in FIG. 3;

DESCRIPTION OF THE PREFERRED EMBODIMENT

Figure 1:
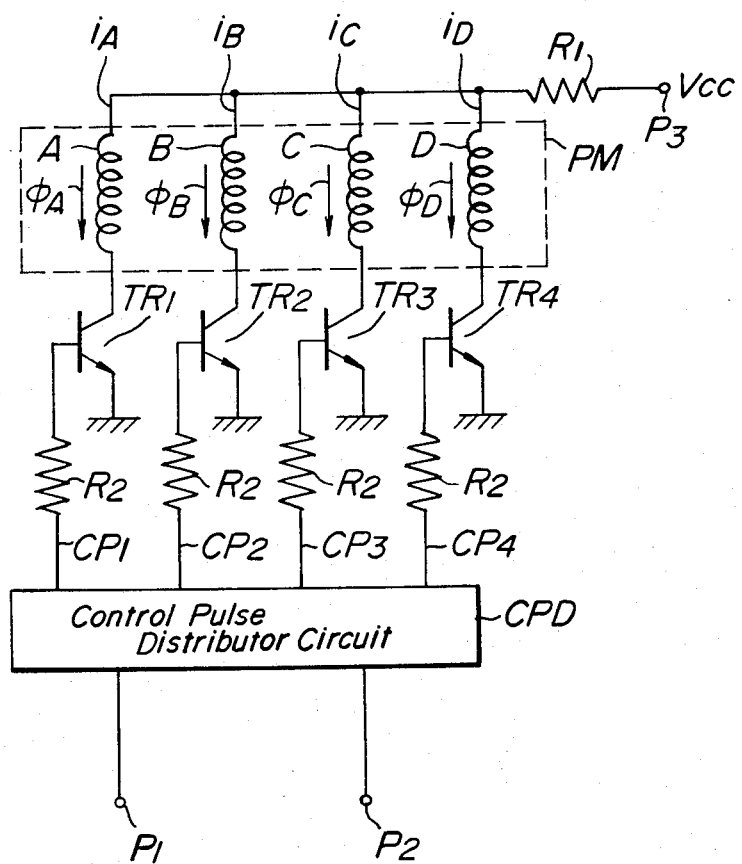
FIG. 1 is a circuit diagram showing a construction of a conventional stepping motor driving device.

Referring now to the drawings, there is shown an embodiment of a device for driving a stepping motor according to the present invention.

Figure 3:
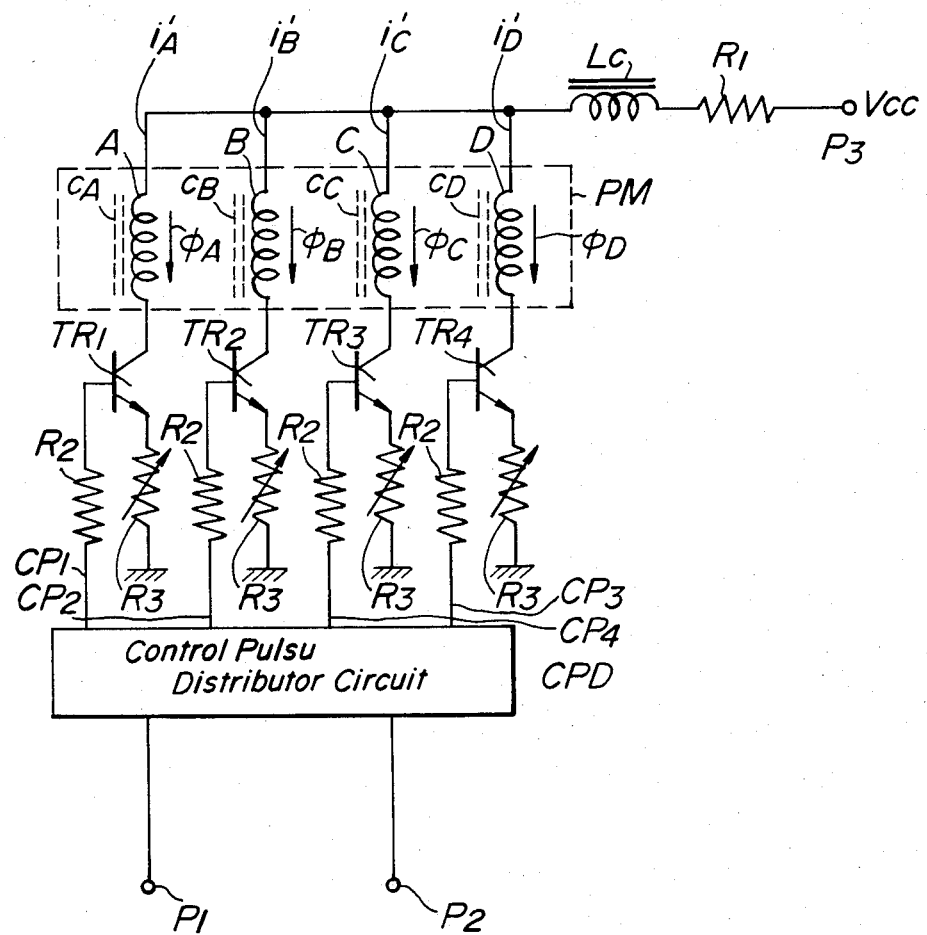
FIG. 3 is a circuit diagram showing a construction of one embodiment of a device for driving a stepping motor according to the present invention.

As shown in FIG. 3 the driving device comprises a current limiting means connected between the resistor $R_1$ and a common junction point of phase coils A, B, C and D. The current sustaining means is a choke coil $L_c$. In the present embodiment a plurality of variable resistors $R_3$ are connected between the emitter electrodes and a grounded point, respectively. The other constructional portions of the driving device are the same as that of the device shown in FIG. 1 so that the explanation thereof is omitted.

The choke coil $L_c$ has characteristics for preventing abrupt change of the current and making a flowing current constant so that the sum of currents flowing through phase coils A, B, C and D becomes always constant.

FIG. 4 is a waveform chart showing input pulses supplied to the driving device, i.e., the currents $i_A'$, $i_B'$, $i_C'$ and $i_D'$ flowing through the phase coils A, B, C and D of the device according to the present invention. As is seen from FIG. 4 it is found that the input pulse currents $i_A'$ to $i_D'$ generated in accordance with distribution of the control pulses $CP_1$, $CP_2$, $CP_3$ and $CP_4$ have a steep leading edge. With the steep leading edge of the input pulse the rising pulse of voltage $v_A'$ becomes 100 to 120 V at the leading edge instant of the input pulse current $i_A'$ and the falling pulse of voltage $V_A'$ becomes 130 to 150 V at the trailing edge instant of the input pulse current $i_A'$. This, also shows the improvement of pulse waveform.

Figure 2:
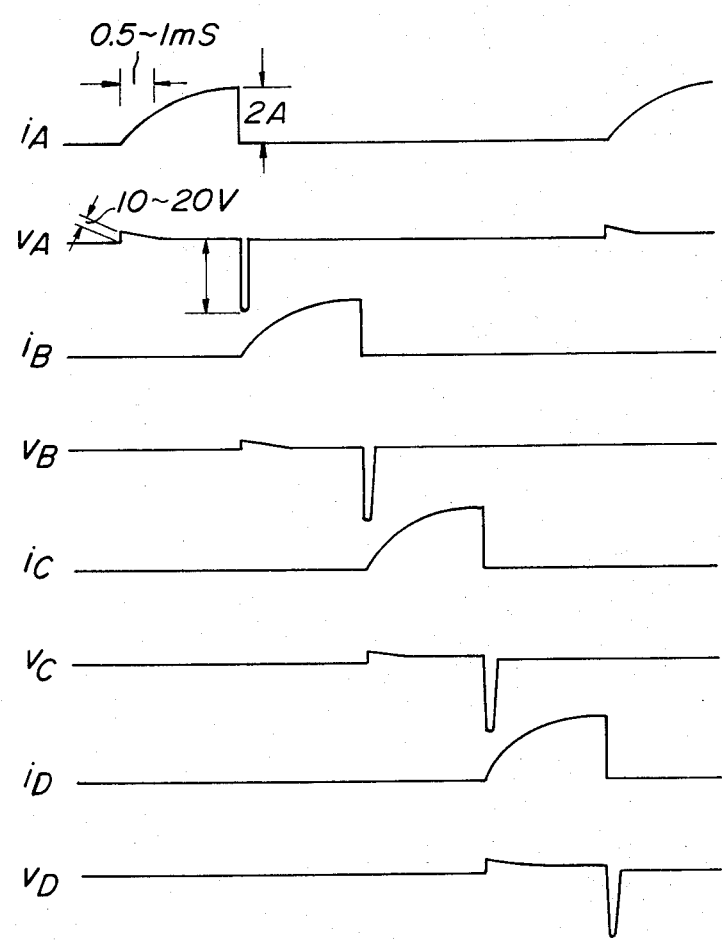
FIG. 2 is a waveform chart explaining an operation of the driving device shown in FIG. 1.

Now, the point of changing over the input pulses from the phase coil A to the phase coil B is considered. In the conventional driving device, as shown in FIG. 2 the current pulse $i_B$ has a characteristic that the current gradually increases from zero to a steady value because of an impedance of the phase coil B at the changing over instant thereby affecting the torque of the stepping motor. In case of driving the motor by the pulses with high frequency, therefore, this phenomenon becomes remarkable and the input pulses are changed over to the next phase coil before the input pulses reach the steady value resulting in a decrease of the torque, so that it is impossible to perform a high speed driving. In the present invention such a disadvantage can be overcome due to the instantaneous leading edge characteristic thus obtained. It is found by the experimental result that maximum rotational speed of the motor becomes 1.5 to 2 times that of the conventional motor.

Moreover, according to the present invention the amplitude or magnitude of the rising pulse voltages supplied to the phase coils can be set to any value.

Figure 5A:
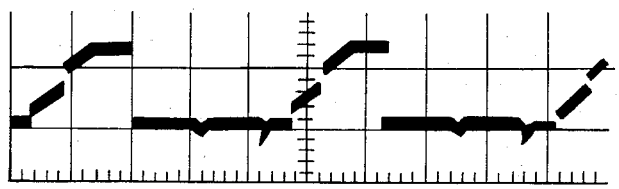
FIG. 5a is a graph showing experimental results of the current characteristics of the conventional driving device which is obtained by an oscilloscope.
Figure 5B:
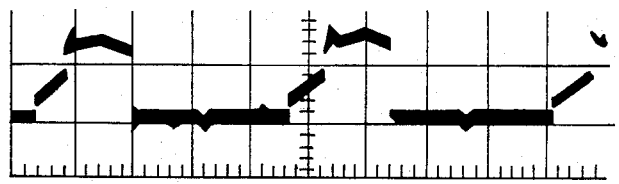
FIG. 5b is a graph showing experimental result of the current characteristics of the present driving device which is obtained by the oscilloscope.

FIG. 5a is an oscillograph showing experimental result of current characteristics of the conventional device and FIG. 5b is an oscillograph showing experimental results of current characteristics of the present driving device.

In the present embodiment cores $C_A$, $C_B$, $C_C$ and $C_D$ of phase coils A to D are made by a material suitable for high speed magnetic change, such as a ferrite material so that leading edge characteristic of input pulses can also be improved.

According to the present invention there is provided a simple device ffor driving a stepping motor only by inserting a current sustaining means between the phase coils and the power supply source.

The time constant for a current flowing through a coil L and a resistor R connected in series therewith is represented by L/R, that is, it is proportional to the inductance L and is inversely proportional to the resistance R, so that the inductance L serves to prevent the current flowing therethrough from being abruptly changed. That is, it is difficult to flow the current through the inductance L abruptly. This means that it is also difficult to decrease the current flowing through the inductance L abruptly. The present invention utilizes this principle.

Figure 6:
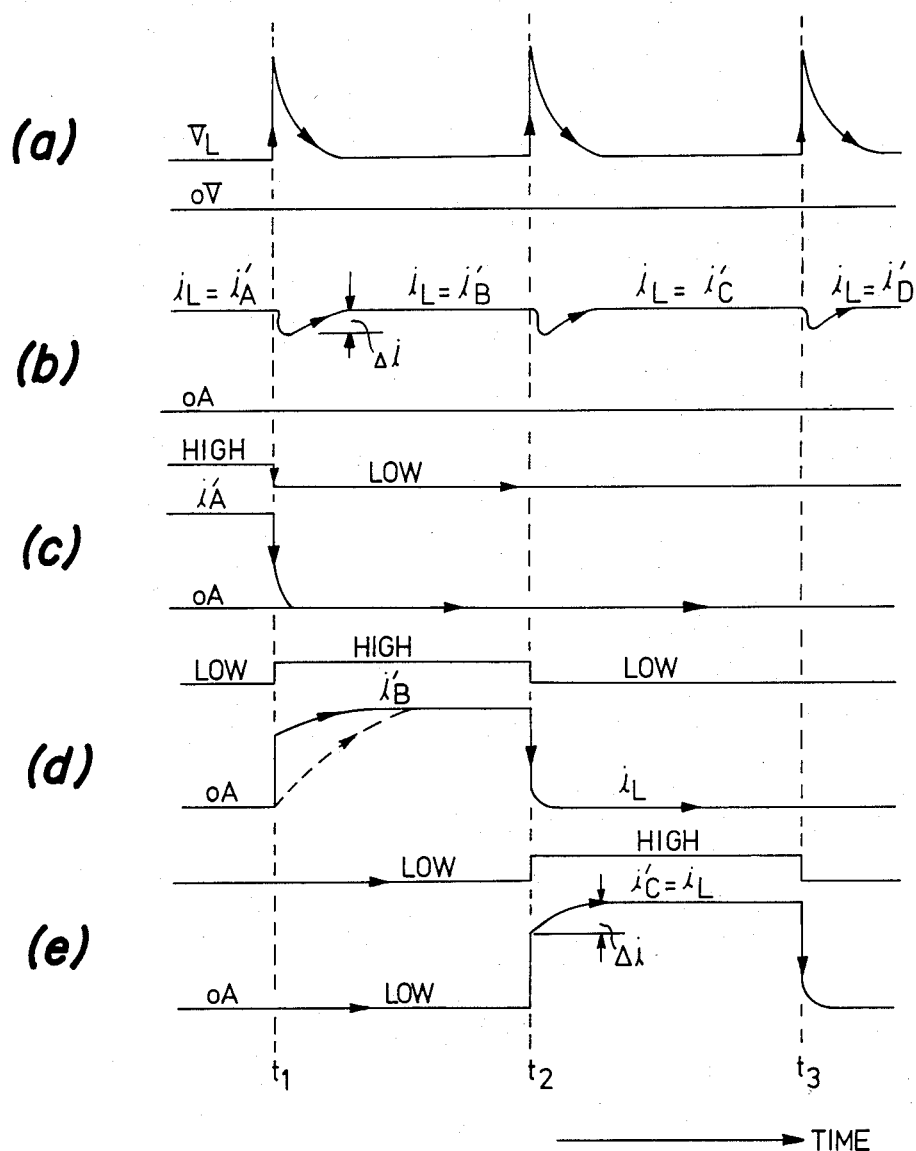
FIG. 6 is a time-magnitude comparison chart illustrating how certain currents vary with time in relation to zero current.

As seen from FIG. 3, when the transistor $TR_1$ is switched to ON state, the current $i_L$ flowing in the choke coil $L_c$ is equal to the current $i_A'$ flowing through the phase coil A, since the current $i_A'$ flows from the voltage source Vcc to the grounded point through the resistor $R_1$, the choke coil $L_c$, the phase coil A, the switching transistor $TR_1$ and the variable resistor $R_3$. In this case, the voltage at the common junction between the choke coil $L_c$ and the respective phase coils A, B, C and D is shown in FIG. 6 at (a). That is, the current $i_L$ is changed over from the phase coil A to the phase coil B at the instant $t_1$, from the phase coil B to the phase coil C at the instant $t_2$, and from the phase coil C to the phase coil D at the instant $t_3$ so that the kick voltage appears, respectively, as shown. Therefore, the current $i_L$, flowing through the choke coil $L_c$ is equal to the current $1_A'$ flowing through the phase coil A, thereby maintaining a constant value (steady state current). When the control pulse $CP_1$, by which the switching transistor $TR_1$ is rendered ON, is made low-level, thereby rendering $TR_1$ OFF, and in order for the current to flow through the phase coil B, the control pulse $CP_2$ is made high-level, thereby rendering the transistor $TR_2$ ON, the current $i_L$ flowing through the choke coil $L_c$, that is, the current $i_A'$ which flowed through the phase coil A till now becomes not zero, but a steady value, since the choke coil $L_c$ prevents the current flowing therethrough from changing and serves to maintain the current as it is. Refer to FIG. 6 at (b).

In this case, as shown in FIG. 6 at (c), the current $i_A'$ itself becomes abruptly zero because of the OFF state of the transistor $TR_1$, while as shown in FIG. 6 at (d), the current $i_L$ is already switched over to the current flowing through the phase coil B, so that the current $i_B'$ rises abruptly. In this case, the current flowing through the choke coil $L_c$ is slightly decreased only by $\Delta i$. That is, as shown in FIG. 6 at (d) by a dotted line, in the conventional device, the current starts from zero value, but in the present invention as shown in FIG. 6 at (d) by a solid line only the decrement $\Delta i$ need be compensated. The same operations are also repeated at instants $t_2$ and $t_3$. In brief, the currents $i_A'$, $i_B'$, $i_C'$ and $i_D'$ flowing through the phase coils A, B, C and D, respectively, have a starting point other than zero level, so that a rapid rise time of current can be obtained and thus speed response of the stepping motor becomes very fast.

The resistors $R_3$ are inserted in the switching circuits of respective phase, respectvely, to determine the value of the steady current in the case of the ON state of the respective switching transistors $TR_1$ to $TR_4$. Therefore, when the high-level voltage of the control pulses CP is set to 1.5 V, the steady current of respective phase coils becomes about 2 A. In this case the resistor $R_2$ has, for example, 10Ω, and the voltage drop across the emitter to the base of the respective switching transistors is set to 0.5 V. The resistor $R_1$ is an internal resistance of the choke coil $L_c$ and has a resistance of 1Ω or less. The choke coil $L_c$ has an inductance of 0.1 to 0.5H, and each of the phase coils A, B, C and D has an inductance of 12 mH and an internal DC resistance of 3Ω.

As described above, each phase coil is selected as having an inductance of 12 mH and the choke coil is selected as having an inductance of 0.1 to 0.5H. The inductance of the choke coil $L_c$ effects the alternating current, but the present invention utilizes current inertia so that once a current flows, the choke coil makes the current constant. That is, the energy due to the steady current flowing through the inductance is advisedly made large, and the property of inductance of tending to maintain that this constant current continuously is utilized, thereby preventing the current from being decreased to zero.

What is claimed is:

1. A circuit for driving a stepping motor, comprising:
   a power supply source,
   a plurality of phase coils, each having a respective inductance $L_m$,
   a switching transistor connected to each said phase coil, each said transistor having an emitter and a control electrode,
   a regulatory resistor having a resistance $R_c$ connected to the emitter of each said switching transistor,
   a pulse distributing circuit connected to supply ON and OFF signals to the control electrodes of the switching transistors, said pulse distributing circuit having a pulse period $T_p$,
   current holding means connecting the phase coils to said power supply source and comprising a resistance R and an inductance $L_c$ in series, $L_c$ being much larger than $L_m$, and provding for each said phase coil a total inductance $L=L_m+L_c$ which changes little when the coil is switched ON and OFF, so that the coil's time constant L/R is larger than $T_p$ while the time constant $L_m/R_c$ is smaller than $T_p$ and smaller than L/R, so that the time constant L/R is always larger compared with $T_p$, even at the highest operating speed.

2. A circuit for driving a stepping motor as claimed in claim 1, wherein the current holding means is a choke coil.

* * * * *